ELECTRON BEAM CONVERGENCE SYSTEMS

Original Filed Nov. 30, 1950 2 Sheets-Sheet 1

INVENTORS
GORDON E. KELLY
& ROBERT D. FLOOD
Rin D. Mitchell
ATTORNEY

ELECTRON BEAM CONVERGENCE SYSTEMS

Original Filed Nov. 30, 1950 2 Sheets-Sheet 2

INVENTORS
GORDON E. KELLY
& ROBERT D. FLOOD
BY
Rin V. Mitchell
ATTORNEY

United States Patent Office

Re. 24,740

Reissued Dec. 1, 1959

24,740

ELECTRON BEAM CONVERGENCE SYSTEM

Gordon E. Kelly and Robert D. Flood, Delaware Township, Camden County, N.J., assignors to Radio Corporation of America, a corporation of Delaware Original No. 2,737,609, dated March 6, 1956, Serial No. 198,314, November 30, 1950. Application for reissue December 3, 1956, Serial No. 626,572

14 Claims. (Cl. 315—13)

Matter enclosed in heavy brackets [ ] appears in the original patent but forms no part of this reissue specification; matter printed in italics indicates the additions made by reissue.

This invention relates to systems for controlling the electron beams of cathode ray tubes. It pertains particularly to the control of a plurality of electron beam components used in a cathode ray tube so as to effect convergence of said components at all points of a raster scanned in a predetermined plane.

The problem of controlling the convergence of a plurality of electron beam components as they are deflected to scan a raster at a target electrode, for example, one lying in a predetermined plane is one which is frequently encountered in present-day practice. In television systems, for example, the trend is toward the use of kinescopes having target electrodes in the form of luminescent screens which are flatter and of greater area than heretofore used. Also, the overall length of such tubes tends to become shorter. The problem of deflecting an electron beam, or a plurality of electron beam components, in tubes of this character requires the use of techniques for effecting convergence of the electron beam components at all points in the raster plane which heretofore have not been required.

A particular example of such a cathode ray tube, which will be referred to herein for illustrative rather than restrictive purposes, is a multi-color kinescope for use in color television systems. A representative multi-color kinescope forms the subject matter of a United States Patent No. 2,595,548 of Alfred C. Schroeder, granted May 6, 1952. This tube has a luminescent screen consisting of a multiplicity of phosphor areas of subelemental dimensions. The different phosphor areas are capable of producing a light of different colors when excited by electron beam energy. The different screen areas are scanned by a plurality of electron beams, from separate guns, which approach the screen from different angles through an apertured masking electrode. Color selection is effected by the angle of electron beam approach to the screen.

Another multi-color kinescope of the type adapted to employ the present invention forms the subject matter of a copending United States application of Russell R. Law, Serial No. 165,552, filed June 1, 1950, and titled "Color Television." In most respects, the tube of the type proposed by Law is essentially similar to the tube proposed by Schroeder; the chief difference is that the Law type of tube employs a single electron gun to produce the plurality of electron beam components. This is effected by imparting a spinning type of movement to the beam so that it is caused to rotate about the central or longitudinal axis of the tube. In rotating about the tube axis, it occupies, at successive intervals, substantially the same positions as those occupied by the separate electron beams of the Schroeder tube.

The expression "electron beam components," as used in this specification and claims, is intended to cover the type of phosphor-exciting electronic energy produced by a single or a plurality of electron guns. This energy may be continuous or pulsating as required without departing from the scope of the invention.

In order to successively operate a multi-color kinescope of the type referred to, it is necessary that the plurality of electron beam components be made to converge substantially in the plane of the masking electrode at all points in the scanned raster. Since the different points of the raster scanned in the plane of the target electrode are at different distances from the point of electron beam deflection, it is seen that it is necessary to provide a dynamic convergence control of the electron beam components in order that they may be made to converge in the desired manner.

One such electron beam control system forms the subject matter of a copending United States application of Albert W. Friend, Serial No. 164,444, filed May 26, 1950, *now Patent No. 2,751,519 issued June 19, 1956,* and titled "Electron Beam Controlling System."

In the Friend application, there is provided an electron-optical system which is variably energized as functions of both the horizontal and vertical deflection frequencies at which the electron beam components are deflected. As demonstrated in the Friend application, it is seen that the dynamic convergence control, both at horizontal and vertical deflection frequencies, should vary substantially as a parabolic function. This fact follows from the fact that, without convergence control, the electron beam components would converge at points having a locus which is approximately parabolic in form.

It has been found in practice that the development of a parabolic wave form, particularly at the horizontal deflection frequency, for dynamic convergence of a plurality of electron beam components, requires the use of relatively complex and expensive apparatus. This results from the character of the wave and the requirements of the system. The magnitude of the wave used for effecting convergence must increase with increases in the angle of deflection from the central axis of the tube. Accordingly, at the corners and edges of the scanned raster, the total peak-to-peak voltage of the parabolic wave must be exceedingly high.

Accordingly, it is an object of the present invention to provide an improved electron beam control system by which to effect convergence of a plurality of electron beam components substantially at all points in the plane of a target electrode without the necessity of generating complex wave forms.

Another object of the invention is to provide an improved beam control system for a multi-color kinescope in which convergence of a plurality of electron beam components is effected under the control of energy having substantially a sinusoidal wave form.

Still another object of the invention is to provide an improved electron beam convergence control system in which substantially sinusoidal control wave forms are simply developed from energy derived from the horizontal deflection wave generators.

A further object of the invention is to provide, in a system for controlling the operation of a cathode ray tube, an improved generator of electrical control waves.

The invention is employed in conjunction with an electron-optical system for effecting convergence of a plurality of electron beam components substantially at all points of a target electrode of the type embodied in multi-color kinescopes. The cathode ray tube is provided with a field-producing means located adjacent to the paths of the electron beam components. The field-producing means is energized, first, as a parabolic function at the vertical beam deflection frequency, and, second, as a sinusoidal function at the horizontal beam deflection frequency.

More specifically, in accordance with an embodiment of the invention in conjunction with a multi-color kinescope wherein the electron beam components are derived, respectively, from different electron guns, the field-producing means includes anodes of the kinescope. The parabolic wave at vertical beam deflection frequency is produced by integrating saw-tooth wave derived from the vertical deflection wave generator. The substantially sinusoidal convergence control wave at horizontal deflection frequency is produced by exciting a parallel tuned circuit, resonant at the horizontal deflection frequency, by means of a parabolic wave at this frequency derived from a point in the horizontal deflection wave generator.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

In the drawings:

Figure 3 is a fragmentary schematic diagram of an illustrative form of a horizontal convergence control wave generator in accordance with the invention; [and,]

*Figure 5 is a circuit diagram of a representative form of horizontal deflection wave generator which may be used in conjunction with this invention.*

Figure 1:
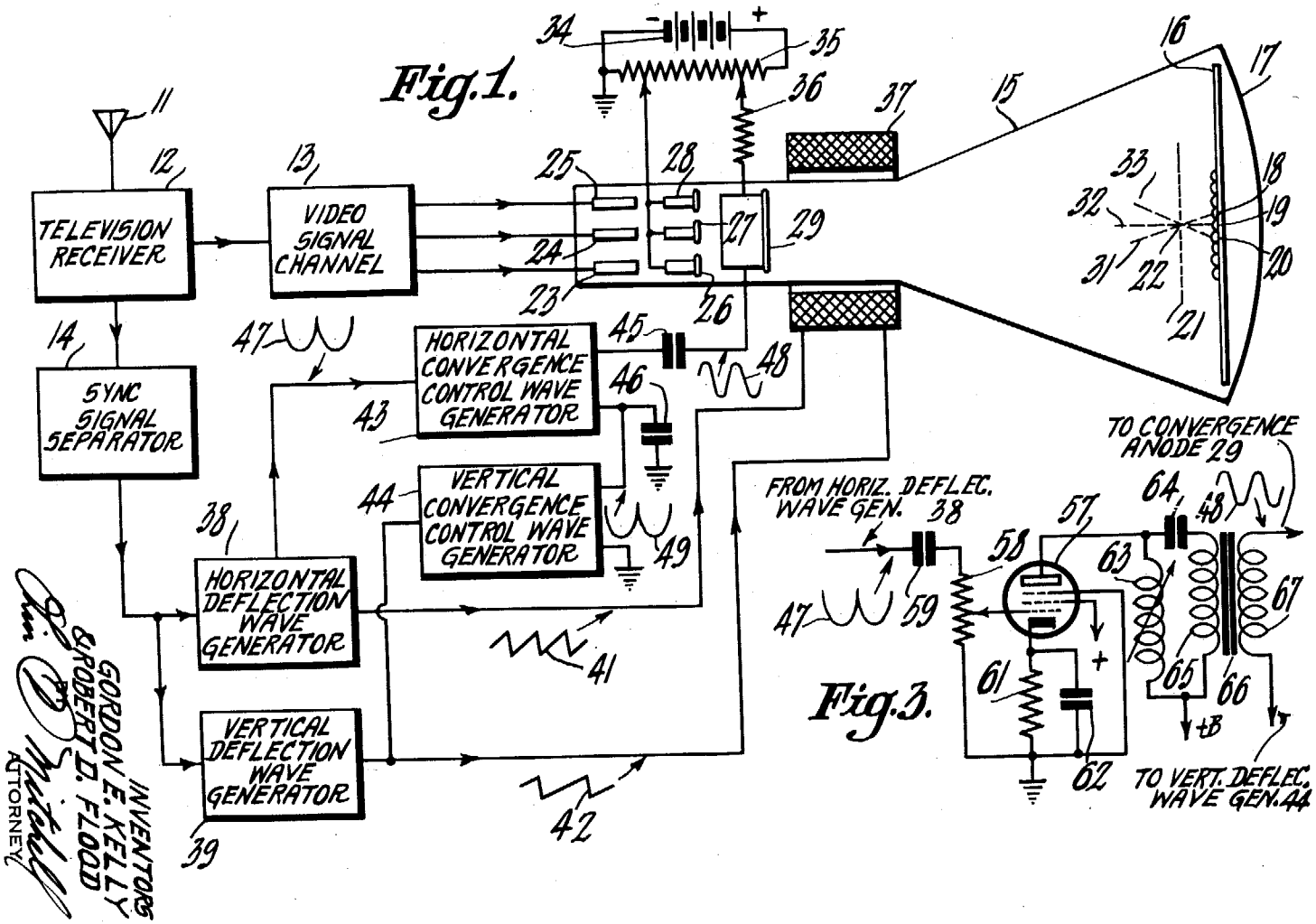
Figure 1 is a block diagram of a television receiver embodying the present invention.

Reference first will be made to Figure 1 for a description of the general form of a television receiver in which the present invention may be embodied. The receiver includes an antenna 11 to which is coupled a conventional television signal receiver 12. It will be understood that the receiver 12 may include such conventional apparatus as carrier wave amplifiers, a frequency converter and a carrier wave demodulator or signal detector. Accordingly, the video and synchronizing signals will be understood to be derived from the receiver 12. The video signals are impressed upon a video signal channel 13 and the synchronizing signals are impressed upon a synchronizing signal separator 14. The video signal channel 13 is coupled to the electron beam control apparatus of an image-reproducing device, such as a kinescope 15.

In the present instance, it is assumed that the invention is embodied in a color television system. In this case, the kinescope 15 may be of either of the types disclosed in the Schroeder patent and Law application previously referred to. For illustrative purposes, it is assumed that the kinescope 15 is of the general type disclosed in the Schroeder patent. The luminescent screen 16 of the kinescope 15 consists of a transparent flat plate which is mounted in back of, and somewhat spaced from, the end wall 17 of the tube. The luminescent portion of the screen, which is on the side of the transparent plate remote from the end wall 17, consists of a multiplicity of groups of phosphor elements, each element being of such size that a group of them is of elemental image dimensions. For example, one such group of phosphor elements or dots consist of the red, green, and blue light-producing dots 18, 19 and 20, respectively. The groups of phosphor dots may be arranged in any desired pattern, such as clusters of circular triangular, hexangular or other configurations, or even in linear strips extending from one side of the screen to the other.

For use in conjunction with a luminescent screen of the character described, the tube 15 also is provided with an apertured masking electrode 21. This electrode is mounted in back of, and in spaced relation to, the screen 16. It also is provided with apertures conforming in shape substantially to the configurations of the groups of phosphor dots. For example, in the case of substantially circular groups of phosphor dots, the apertures such as 22 will be substantially circular. One aperture is provided in this electrode for each group of phosphor dots. The apertures of the masking electrode 21 also are arranged with respect to the associated groups of phosphor dots so that proper selective excitation of the phosphor areas may be effected to produce the desired component colors of the image.

The multi-color kinescope 15, also in accordance with the disclosure of the Schroeder patent referred to above, is provided with three electron guns 23, 24 and 25, which will be referred to hereinafter as the red, green and blue guns, respectively. These designations are made because the electron guns are effective to excite the red, green and blue light-producing phosphor areas of the screen 16. Also, as part of the electron-optical system of the tube, there are provided with, or as part of the electron guns, second anodes 26, 27 and 28. These anodes serve to focus the electron beams produced respectively by the guns 23, 24 and 25 into the target area which includes the screen 16 and the masking electrode 21. Such electron-optical apparatus will be understood to be conventional in substantially any cathode ray tube.

The kinescope 15, however, in the present instance, includes an additional electrode 29 having a substantially cylindrical form for use in effecting convergence of the three electron beams in the plane of the masking electrode 21. This is indicated schematically in this figure of the drawing. For example, in order to excite the red, green and blue light-producing phosphor dots 18, 19 and 20, respectively, the electron beams indicated at 31, 32 and 33 converge in the aperture 22 of the masking electrode 21 substantially as shown. Travel of the electron beams beyond the masking electrode causes impingement with the proper phosphor dots or luminescent screen.

The individual electron beam-focusing electrodes 26, 27 and 28 function by reason of having impressed thereon a potential of the order of 3,000 volts which is of positive polarity relative to the cathodes of the electron guns 23, 24 and 25. The convergence anode 29 functions in conjunction with the conventional electrode structure of the kinescope 15 to produce a field by which to effect the desired convergence of the electron beam. This field is produced by impressing a potential upon the convergence anode 29 of the order of 6,000 to 7,000 volts relative to the focusing anodes 26, 27 and 28.

The manner in which these potentials are applied to the electron-optical system of the kinescope 15 as described, is indicated diagrammatically. A source of unidirectional voltage, such as indicated by a battery 34, has connected to the terminals thereof, a voltage dividing resistor 35. The negative terminal of the power supply 34 is grounded and it is assumed that the cathodes of the electron guns 23, 24 and 25 are operated substantially at ground potential. The focusing anodes 26, 27 and 28 are shown connected to a relatively low positive voltage point on the voltage divider 35. In a similar manner, the convergence electrode 29 is shown connected to a more positive point on the voltage divider 35 by a circuit which includes a relatively high impedance resistor 36. For further information regarding the operation of beam convergence apparatus with which the present invention may be employed, reference may be had to a publication dated April 1950 by Radio Corporation of America and titled "General Description of Receivers for the RCA Color Television System Which Employs the RCA Direct-View Tri-Color Kinescope."

The kinescope 15 also is provided with a beam-deflecting system which, in the present case, includes an electromagnetic yoke 37. The deflecting yoke is mounted in the usual manner around the outside of the neck portion of the kinescope adjacent to the conical section thereof. It also is energized in a conventional manner, which will be referred to subsequently.

The synchronizing signal separator 14 is coupled to horizontal and vertical deflection wave generators 38 and 39, respectively. These generators may be entirely conventional. Accordingly, it will be understood that a substantially saw-tooth wave, such as 41 at the line scanning frequency, is derived from the horizontal deflection wave generator 38 and is impressed upon the yoke 37. Similarly, a substantially saw-tooth wave, such as 42 at the field scanning frequency, is derived from the vertical deflection wave generator 39, and also is impressed upon the yoke 37.

The system, in accordance with the present invention, also includes horizontal and vertical convergence control wave generators 43 and 44, respectively. The input circuits of these generators are coupled to the horizontal and vertical deflection wave generators 38 and 39, respectively. The output circuits of the convergence control wave generators are combined with one another and are coupled by a capacitor 45 to the convergence electrode 29 of the kinescope 15. By such an arrangement, there is impressed upon the convergence electrode 29, a dynamic control wave, in addition to the steady energization thereof previously described. The junction point between the output circuits of the generators 43 and 44 is by-passed to ground by a capacitor 46. This capacitor provides a by-pass for the horizontal control wave and, at the same time, provides a high impedance for the vertical control wave.

In this form of the invention the horizontal convergence control wave generator 43 has its input circuit connected to a point in the circuit of the horizontal deflection wave generator 39 from which there may be derived a wave such as 47 having a substantially parabolic form and a frequency corresponding to the line scanning frequency. One convenient point in the horizontal deflection wave generator 38, from which the parabolic wave 47 may be derived, is the damper-booster apparatus. A typical damper-booster of the type referred to is disclosed in an article by Albert W. Friend titled "Television deflection circuits," published at page 98 of the March 1947 RCA Review, volume VIII, No. 1. A representative form of such a damper-booster is shown in Figure 19 of the article.

Another convenient source of a horizontal frequency parabolic wave is the cathode of the horizontal deflection tube. The cathode circuit of such a tube usually includes a network which functions to integrate the current of saw-tooth form traversing it so as to produce a parabolic wave suitable for use in the practice of this invention.

*Figure 5 of the drawings is identical to Figure 19 of the Friend article and shows various points from which may be derived a suitable wave to energize the horizontal convergence control wave generator 43. The yoke 37 is energized by a substantially sawtooth current wave derived from a driver tube V2 through a transformer T. The driver tube has a cathode circuit which includes a by-passed resistor RK so that there is developed at the cathode of tube V2 a substantially parabolic wave at the horizontal deflection rate and which is a modification of the indicated substantially square wave produced at the anode of this tube. The damper tube V3 also has a cathode circuit which includes a resistive element RD which is by-passed by a capacitor CD so that there is developed at the cathode of this tube a substantially parabolic wave at the horizontal deflection rate and this wave also is a modification of the indicated substantially square wave produced at the anode of tube V3 and at one terminal of the yoke 37. Thus, the energizing wave for the horizontal convergence control wave generator 43 may be derived, as desired, from any of the points of the horizontal deflection wave generator such as the damper-booster apparatus including tube V3 or the cathode of the driver tube V2, for example.*

The horizontal convergence control wave generator 43 functions in a manner to be described in greater detail subsequently to convert the parabolic wave 47 into a substantially sinusoidal wave, such as 48.

The vertical convergence control wave generator 44 may have its input circuit coupled directly to the output circuit of the vertical deflection generator 39. By this means, a substantially saw-tooth wave, such as 42, is impressed upon the convergence control wave generator 44. This apparatus functions in a manner to be described presently to convert the saw-tooth wave 42 into a substantially parabolic wave, such as 49.

The inter-coupling of the output circuits of the horizontal and vertical convergence control wave generators 43 and 44 serves to combine the sinusoidal and parabolic waves 48 and 49 for impression upon the convergence control electrode 29. The dynamic energization of this electrode by means of these waves effects convergence of the electron beams 31, 32 and 33 substantially in the plane of the masking electrode 21 for all points in the raster scanned by deflecting these beams in a conventional manner.

Before considering in more detail the apparatus embodying the present invention, reference will be made to Figure 2. The purpose of this figure is to illustrate graphically, the general manner in which a sinusoidal wave may be used to effect dynamic convergence at the line scanning frequency with substantially the same effectiveness as a parabolic wave. In this figure, a portion of a representative composite television signal wave is shown by the curve 51. The portion 52 represents the video signal in one horizontal line of the image. The wave portions 53 represent the horizontal blanking pulses and the portions 54 represent the horizontal synchronizing pulses. The horizontal blanking periods are indicated as extending from the leading to the trailing edges of the pulses 53. Also, the horizontal line period is indicated as extending between the trailing edges of successive horizontal synchronizing pulses 54. The picture period of each horizontal line is indicated as extending between the trailing edge of one of the horizontal blanking pulses 53 to the leading edge of the succeeding horizontal blanking pulse.

It will be understood that, since the luminescent screen of the kinescope is not energized by electron beam energy during the blanking periods, attention need only be given to convergence of the beam component during the picture periods. It has been determined that, with a minimum dynamic energization of the convergence electrode when the electron beams of the kinescope are directed toward the central point of the scanned raster, a maximum energization of this electrode is required when the electron beams are deflected toward the vertical edges of the scanned raster. The variation of this voltage should follow substantially a parabolic function.

Figure 2:
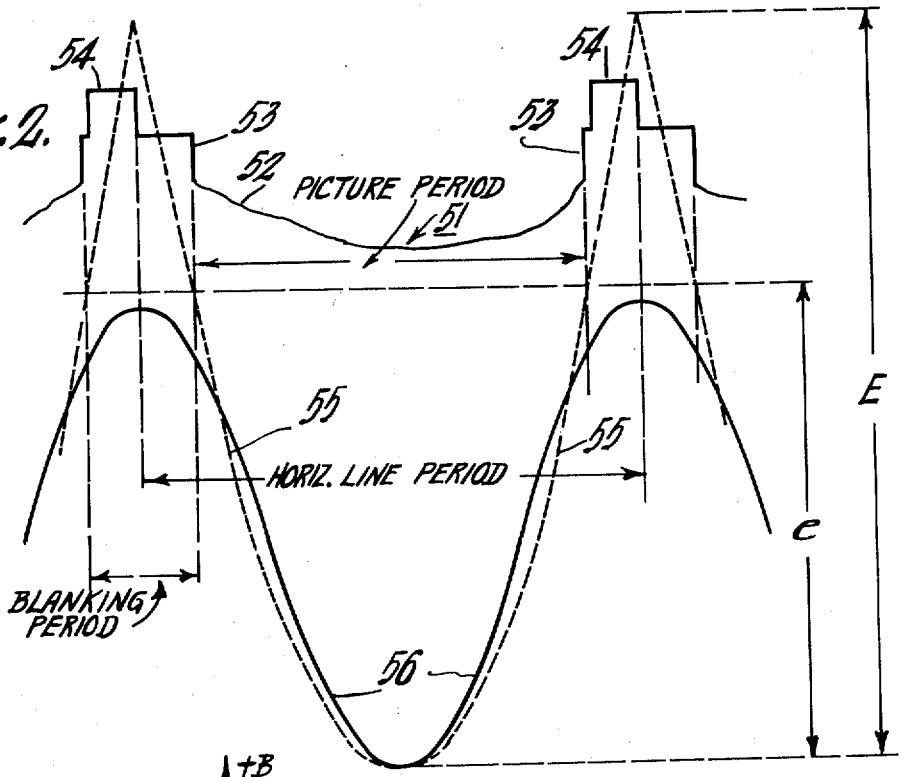
Figure 2 is a graphical representation of the manner in which the system embodying the invention operates.

Accordingly, in Figure 2, the broken line curve 55 represents a voltage having a substantially parabolic form and a frequency equal to the horizontal scanning frequency. It is seen that the positive, or upwardly extending, peaks of this wave coincide with the midpoints of the blanking periods between horizontal lines. Also, it is seen that the negative peaks of the wave 55 occurs substantially at the center of the horizontal lines. As graphically illustrated, a voltage variation represented by "e" is required to effect the desired dynamic beam convergence control in a horizontal sense. However, in order to develop a voltage having a substantially parabolic wave form for use in a system of this character, it is necessary to develop a parabolic voltage wave having peak-to-peak amplitude represented by "E." It is seen that a substantial portion of the total available amplitude of such a wave is not required in a system of this character. Approximately that portion of the voltage represented by "E," which exceeds the required voltage indicated by "e," is not needed.

Furthermore, in order to develop a parabolic voltage of the proper phase required, it is necessary to employ an output transformer having the capability of passing harmonics of the third order and higher with negligible phase distortion. Such a transformer necessarily is an expensive component. It is seen, therefore, that an output tube having a higher power handling capability than is needed for the energization of the convergence electrode is required when parabolic voltage waves are employed and also an excessively expensive output transformer must be supplied.

By reference to Figure 2, it will be seen that a sinusoidal voltage wave such as represented by the curve 56 may be employed in accordance with this invention with substantially the same success as the theoretically required parabolic voltage ways. It may be seen from an inspection of the curves 55 and 56 that, during most of the picture period, the two waves closely coincide. The departure of the sinusoidal wave 56 from coincidence with the parabolic wave 55, occurs substantially entirely within the blanking periods between horizontal picture lines. Furthermore, it may be seen that the peak-to-peak amplitude of the sinusoidal wave 56 is substantially equal to that required for the dynamic energization of the convergence electrode as indicated by "e."

It will be understood by those skilled in the art that the use of a sinusoidal voltage wave for horizontal dynamic convergence control enables a material simplification in the design of the apparatus. Compared with the problem of generating a parabolic wave at the horizontal deflection frequency the generation of a sinusoidal wave of the same frequency is quite simple. The power requirements are substantially less and also more economical components may be used.

By referring now to Figure 3 of the drawings, there will be described apparatus embodying an illustrative form of the invention for derivation of the horizontal convergence control wave having a sinusoidal form. The apparatus includes an electron tube 57 which, in the illustrated case, is a pentode, such as an RCA type 5763. The suppressor and screen grids of the tube are conventionally connected respectively to ground and to a source of positive potential relative to the cathode. The control grid of the tube 57 is connected to a potentiometer 58, upon the terminals of which is impressed a parabolic wave such as 47 by means of a capacitor 59 coupled to the horizontal deflection wave generator 38 as indicated. The capacitor 59 may be coupled to the cathode of the output tube of a conventional horizontal deflection wave generator. It is customary to include in the cathode circuit of such a tube a network of resistance and capacitance of a character serving to integrate the substantially saw-tooth current traversing the cathode circuit in a manner to develop a substantially parabolic voltage wave at the cathode.

The cathode of the tube 57 is connected to ground, or other point of fixed potential, by a resistor 61 which is by-passed for alternating currents by a capacitor 62. The anode of the tube 57 is connected to a source of positive voltage indicated at +B through an inductance device such as a coil 63. Briefly, this coil should be of a character to permit a variation of its inductance for a purpose to be described presently. Accordingly, it may be provided with a movable core if desired. The anode of the tube 57 is coupled by a capacitor 64 to the primary winding 65 of an output transformer 66. The transformer also is provided with a secondary winding 67 which is connected as indicated between the vertical convergence control wave generator 44 and the convergence anode 29 of the kinescope 15.

By means of the coil 63 in conjunction with the primary transformer winding 65 and the capacitor 64, the output circuit of the tube 57 is tuned substantially to the horizontal deflection frequency of 15,750 cycles per second. By this means, there is provided a sinusoidal wave output developed at the secondary transformer winding 67 of sufficient magnitude to effect the desired horizontal dynamic convergence control of the electron beam energy in the manner previously described. Phase control of the generated sinusoidal wave also may be effected by tuning of the coil 63. In this way the wave may be made to conform to the picture and blanking periods as described in conjunction with Figure 2.

Figure 4:
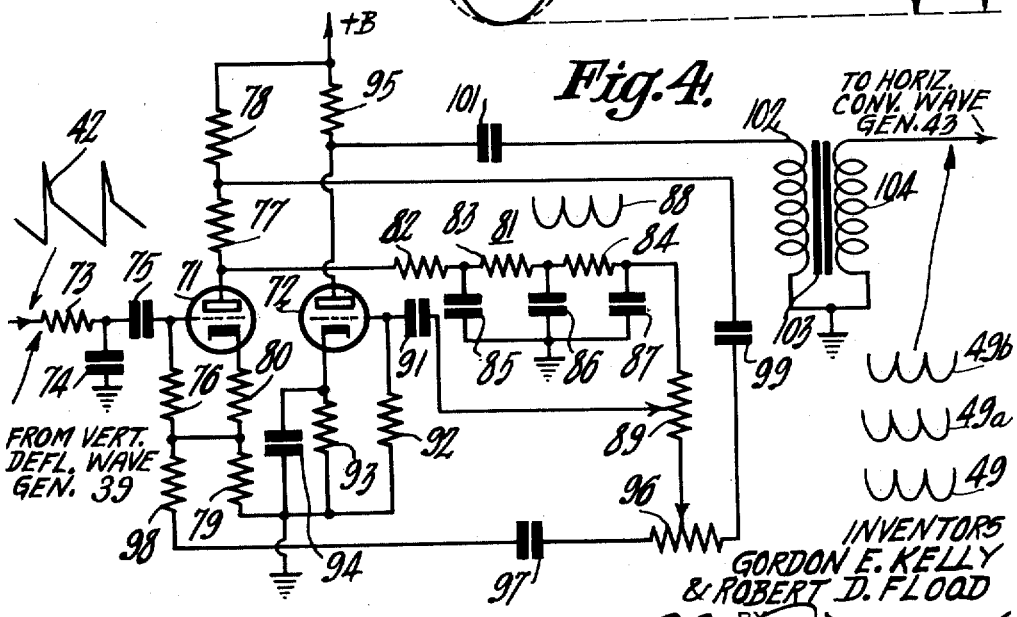
Figure 4 is another fragmentary schematic diagram of an illustrative embodiment of a vertical convergence control wave generator in accordance with this invention [.]; *and*

The parabolic dynamic convergence control voltage at the field scanning frequency may be developed in accordance with the present invention by means of apparatus such as that shown by Figure 4 to which reference now will be made. This apparatus includes electron tubes 71 and 72 which may be triodes as illustrated. It will be understood that the two electron discharge paths may be combined within a single envelope in a double triode, such as an RCA type 12AU7. There is derived from the vertical deflection wave generator 39, a substantially saw-tooth voltage wave 42. This is impressed upon a network including a series resistor 73 and a shunt capacitor 74. By means of this network the voltage indicated at 42 is partially integrated and attenuated. Such a voltage then is impressed by a coupling capacitor 75 and resistor 76 upon the grid of the tube 71. The anode of the tube is connected to a source of positive voltage indicated at +B by load resistors 77 and 78. Accordingly, there is developed at the anode of the tube 71, an amplified wave similar to the input wave 42 but of opposite phase. A similar voltage is developed at the junction point between the resistors 77 and 78.

The cathode of the tube 71 is connected to ground, or other point of fixed potential, by serially connected resistors 79 and 80. It will be noted that these resistors are unby-passed for alternating currents. Accordingly, there is developed by the resistors 79 and 80 a substantially saw-tooth voltage of the same phase as the voltage wave 42. The saw-tooth waves of opposite phase developed in the anode and cathode circuits of the tube 71 are combined with one another and also with a parabolic wave in a manner to be described for impression upon the tube 72.

There is coupled to the anode of the tube 71 an integrating network 81. This network consists of a series connection of resistors 82, 83 and 84 and a plurality of shunt capacitors 85, 86 and 87. By means of this network, the saw-tooth voltage developed at the tube 71 is integrated to provide a voltage such as indicated at 88 having a parabolic wave shape.

The parabolic voltage wave 88 is developed across the resistance portion of a potentiometer 89. The movable element of the potentiometer is connected by a coupling capacitor 91, and a leak resistor 92, therefor, to the control grid of the tube 72. The cathode of this tube is connected to ground through a resistor 73 which is by-passed for alternating currents by a capacitor 94. Space current for the tube 72 is derived from the power supply indicated at +B through a load resistor 95.

The other terminal of the resistor element of the potentiometer 89 is connected to the movable contact of another poteniometer 96. One terminal of the resistance portion of the potentiometer 96 is coupled by a capacitor 97 and a resistor 98 to the junction joint between the cathode-connected resistors 79 and 80 associated with the tube 71. The other terminal of the potentiometer 96 is coupled by a capacitor 99 to the junction point between the load resistors 77 and 78 associated with the anode of the tube 71. It is seen that, by means of these connections of the potentiometer 96, saw-tooth voltages of opposite phase are impressed upon the terminals of the potentiometer so that it may be used in a manner to be described presently.

The anode of the tube 72 is coupled by a capacitor 101 to the primary winding 102 of an output transformer 103. By such means the transformer is shunt fed from the load resistor 95 and direct current saturation thereof is prevented. This transformer also has a secondary winding 104 which is coupled to the horizontal convergence control wave generator 43 as indicated and as shown specifically in Figure 1.

The manner in which the vertical convergence control wave generator of Figure 4 operates is substantially as follows. As previously stated, the integrating network 81 functions to convert the saw-tooth voltage wave 42 into a parabolic wave 88. The magnitude of that portion of the parabolic voltage wave 88 which is impressed upon the grid of the tube is controlled by the adjustment of the potentiometer 89. The connection of this potentiometer to the potentiometer 96 permits the addition of a saw-tooth voltage with the parabolic voltage.

By suitably adjusting the potentiometers 89 and 96 the wave form of the output parabolic wave 49 may be controlled. A symmetrical parabolic wave 49 is generated by adjusting the potentiometer 89 so that a maximum amplitude of the parabolic wave 88 is impressed upon the control grid of the tube 72. If it is desired to make the output parabolic wave 49 unsymmetrical, the potentiometer 89 is adjusted to impress a minimum amplitude of the parabolic wave 88 upon the tube 72. At the same time, an adjustment of the potentiometer 96 to one side or the other of its central position will distort the parabolic wave 49 in opposite senses depending upon the adjustment of the potentiometer 96.

For example, with the arm of the potentiometer 96 moved toward that end of the resistor portion coupled to the cathode of the tube 71, the output voltage wave has a form substantially as indicated at 49a. This is produced by the addition of a saw-tooth voltage of the phase developed at the cathode of the tube 71. An adjustment of the arm of the potentiometer 96 toward the end of the resistor portion coupled to the anode of the tube 71 produces an opposite distortion of the parabolic output wave as indicated at 49b. It is seen, therefore, that suitable manipulation of the potentiometers 89 and 96 renders the apparatus susceptible of operating to control the amplitude of the parabolic output wave 49 and also to control its shape suitably to enable the convergence electrode 29 of the kinescope 15 to maintain beam convergence vertically throughout substantially the entire raster scanned by the beams.

It may be seen from the foregoing disclosure of an illustrative embodiment of the invention that there is provided an improved system for effecting convergence of a plurality of electron beam components substantially at all points in the plane of a target electrode without the necessity of generating complex wave forms. It is seen, from the demonstration made herein, that a sinusoidal wave so closely approximates the theoretically ideal parabolic wave during the horizontal picture periods that a satisfactory result is obtained.

Furthermore, such a sinusoidal wave has about the proper peak-to-peak amplitude to effect the desired convergence control. A sinusoidal wave is much easier to generate than a parabolic wave. The apparatus used for such purpose, therefore, may be quite simple and inexpensive. Moreover, it is not necessary to generate a wave having a peak-to-peak amplitude which is greater than that necessary to accomplish the desired result. In many cases, the peak-to-peak amplitude of a parabolic wave is approximately 72% greater than that of a sinusoidal wave to accomplish substantially the same results. In addition, in order to develop a parabolic voltage wave of proper phase for use in a system of the character described, an output transformer is required which is capable of passing, in addition to the fundamental frequency, harmonics of the third and higher orders with negligible phase distortion. Such a transformer is a relatively expensive component. Also, an output tube having a greater power handling capability is required when a parabolic voltage wave is used as compared with the tube necessary for use when a sinusoidal wave is employed.

Furthermore, it is seen that the illustrative forms of the convergence control wave generators disclosed herein provide facilities for easily changing the phase of the control waves so as to obtain an optimum adjustment. Also, facilities are provided for suitably altering the shapes of some of the voltage waves in order to better adapt them for use in a system of the character described.

The nature of the invention may be determined from the foregoing disclosure of an illustrative embodiment thereof. The scope of the invention is set forth in the following claims.

What is claimed is:

[1. In a cathode ray tube image-reproducing system wherein electron beam energy is angularly deflected both horizontally and vertically relative to the longitudinal axis of the tube to scan a raster at a target electrode, means for effecting said beam deflections under the control of waves having substantially sawtooth forms, a dynamic electron beam controlling system comprising, field-producing means disposed adjacent to the undeflected path of said electron beam energy, and means to produce a wave varying as a sinusoidal function of one of said beam deflections and having the same frequency as said one beam deflection for energizing said field-producing means.]

2. In a cathode ray tube image-reproducing system wherein a plurality of electron beam components, effectively traversing paths spaced, respectively, about a longitudinal axis of the tube, are angularly deflected both horizontally and vertically to scan a raster at a target electrode, means for effecting said beam deflections under the control of waves having substantially sawtooth forms, a dynamic convergence system to effect substantial convergence of said beam components at all points in said raster comprising, field-producing means disposed adjacent to the paths of said beam components, and means to produce a wave varying as a sinusoidal function of one of said beam deflections and having the same frequency as said one beam deflection for energizing said field-producing means.

3. In a cathode ray tube image-reproducing system, the combination as defined in claim 2 wherein, said wave-producing means includes a circuit resonant at substantially the same frequency as said one beam deflection, and means to vary the tuning of said resonant circuit to effect phase control of said produced wave.

4. In a cathode ray tube image-reproducing system wherein a plurality of electron beam components, effectively traversing paths spaced, respectively, about a longitudinal axis of the tube, are angularly deflected both horizontally and vertically to scan a raster at a target electrode, means for effecting said beam deflections under the control of waves having substantially sawtooth forms, a dynamic convergence system to effect substantial convergence of said beam components at all points in said raster comprising, field-producing means disposed adjacent to the paths of said beam components, and means to produce a wave varying as a sinusoidal function of said horizontal beam deflection, and having said horizontal beam deflection frequency for energizing said field-producing means.

5. In a cathode ray tube image-reproducing system wherein a plurality of electron beam components, effectively traversing paths spaced, respectively, about a longitudinal axis of the tube, are angularly deflected both horizontally and vertically to scan a raster at a target electrode, means for effecting said beam deflections under the control of waves having substantially sawtooth forms, a dynamic convergence system to effect substantial convergence of said beam components at all points in said raster comprising, field-producing means disposed adjacent to the paths of said beam components, and means for energizing said field-producing means concurrently as functions of said vertical and horizontal beam deflections, at least one of said functions being sinusoidal, and said sinusoidal energization being at one of said beam deflection frequencies.

6. In a cathode ray tube image-reproducing system wherein a plurality of electron beam components, effectively traversing paths spaced, respectively, about a longitudinal axis of the tube, are angularly deflected both horizontally and vertically to scan a raster at a target electrode, means for effecting said beam deflections under the control of waves having substantially sawtooth forms, a dynamic convergence system to effect substantial convergence of said beam components at all points in said raster comprising, field-producing means disposed adjacent to the paths of said beam components, means to produce a wave varying as a parabolic function of one of said beam deflections for energizing said field-producing means, and means to produce a wave varying as a sinusoidal function of the other of said beam deflections for additionally energizing said field-producing means.

7. In a cathode ray tube image-reproducing system wherein a plurality of electron beam components, effectively traversing paths spaced, respectively, about a longitudinal axis of the tube, are angularly deflected both horizontally and vertically to scan a raster at a target electrode, means for effecting said beam deflections under the control of waves having substantially sawtooth forms, a dynamic convergence system to effect substantial convergence of said beam components at all points in said raster comprising, field-producing means disposed adjacent to the paths of said beam components, means varying as a parabolic function of said vertical beam deflection for energizing said field-producing means, and means to produce a wave varying as a sinusoidal function of said horizontal beam deflection for additionally energizing said field-producing means.

8. In a cathode ray tube image-reproducing system, the combination as defined in claim 7 wherein, said wave-producing means includes a circuit resonant at substantially said horizontal beam deflection frequency, and means to vary the tuning of said resonant circuit to effect phase control of said produced wave.

9. In a cathode ray tube image-reproducing system wherein a plurality of electron beam components, effectively traversing paths spaced, respectively, about a longitudinal axis of the tube, are angularly deflected both horizontally and vertically to scan a raster in a predetermined plane, a dynamic convergence system to effect substantial convergence of said beam components at all points in said raster comprising, field-producing means disposed adjacent to the paths of said beam components, means varying as a parabolic function of said vertical beam deflection for energizing said field-producing means, a horizontal convergence control wave generator including an electron tube having input and output circuits, means for impressing upon said input circuit a wave having a substantially parabolic form and a frequency equal to the horizontal deflection frequency, means tuning said output circuit to said horizontal deflection frequency whereby to produce a substantially sinusoidal wave at said horizontal deflection frequency, and means coupling said horizontal control wave generator to said field-producing means for additionally energizing said field-producing means as a sinusoidal function of said horizontal beam deflection.

10. In a cathode ray tube image-reproducing system wherein a plurality of electron beam components, effectively traversing paths spaced, respectively, about a longitudinal axis of the tube, are angularly deflected both horizontally and vertically to scan a raster in a predetermined plane, a dynamic convergence system to effect substantial convergence of said beam components at all points in said raster comprising, field-producing means disposed adjacent to the paths of said beam components, means varying as a parabolic function of said vertical beam deflection for energizing said field-producing means, a horizontal convergence control wave generator including an electron tube having input and output circuits, said input circuit being coupled to a source of a parabolic wave having said horizontal deflection frequency, a transformer having a primary winding coupled to said output circuit, means including an inductance device coupled to said output circuit for providing parallel tuning of said output circuit at said horizontal deflection frequency, whereby to produce a substantially sinusoidal wave at said horizontal deflection frequency and means including a secondary winding of said transformer for impressing said sinusoidal wave upon said field-producing means as a sinusoidal function of said horizontal beam deflection.

11. In a cathode ray tube image-reproducing system wherein a plurality of electron beam components, effectively traversing paths spaced, respectively, about a longitudinal axis of the tube, are angularly deflected both horizontally and vertically to scan a raster in a predetermined plane, a dynamic convergence system to effect substantial convergence of said beam components at all points in said raster comprising, field producing means disposed adjacent to the paths of said beam components, a vertical convergence control wave generator including a first electron tube having input and output circuits, means for impressing upon said first tube input circuit a wave having a substantially saw-tooth form and a frequency equal to the vertical deflection frequency, integrating means in said first tube output circuit to produce a substantially parabolic wave at said vertical deflection frequency, a horizontal convergence control wave generator including a second electron tube having input and output circuits, means for impressing upon said second tube input circuit a wave having a substantially parabolic form and a frequency equal to the horizontal deflection frequency, means providing parallel tuning of said second tube output circuit at said horizontal deflection frequency, whereby to develop a wave having a substantially sinusoidal form, and means including output transformers coupled between said vertical and horizontal convergence control wave generators respectively and said field-producing means for energizing said field-producing means concurrently as parabolic and sinusoidal functions, respectively, of said vertical and horizontal beam deflections.

12. In a system for controlling the operation of a cathode ray image-repoducing tube, an electrical wave generator comprising first and second electron tubes, each having input and output circuits, means impressing upon the input circuit of said first tube a wave having a substantially saw-tooth form and a relatively low frequency, an integrating network coupled to the output circuit of said first tube and serving to convert said sawtooth wave into a wave having a substantially parabolic form and said relatively low frequency, means coupling said integrating network and the input circuit of said second tube for impressing said parabolic wave upon said second tube, and means coupled to the output circuit of said second tube for developing a wave having a substantially parabolic form of the desired shape and amplitude.

13. An electrical wave generator as defined in claim 12 wherein, said means for coupling said integrating network to said second tube includes a first potentiometer, whereby to control the amplitude of the parabolic wave impressed upon said second tube.

14. An electrical wave generator as defined in claim 13 having in addition, means coupled to the output circuit of said first tube for developing a substantially sawtooth wave at said relatively low frequency, and means coupling said sawtooth wave-developing means to the input circuit of said second tube, whereby to combine said sawtooth and parabolic waves in the output circuit of said second tube.

15. An electrical wave generator as defined in claim 14 wherein, said sawtooth wave-developing means includes a second potentiometer coupled between two points of opposite phase in the output circuit of said first tube, said second potentiometer being connected to said first potentiometer and being adjustable to alter the phase of the sawtooth wave to be combined with said parabolic wave.

References Cited in the file of this patent or the original patent

UNITED STATES PATENTS

| | | |
|---|---|---|
| 2,178,093 | Zworykin et al. | Oct. 31, 1939 |
| 2,220,303 | Tingley | Nov. 5, 1940 |
| 2,225,455 | Klauer | Dec. 17, 1940 |
| 2,312,054 | Schade | Feb. 23, 1943 |
| 2,312,761 | Hershberger | Mar. 2, 1943 |
| 2,338,646 | Kessler | Jan. 4, 1944 |
| 2,485,620 | McCoppin | Oct. 25, 1949 |
| 2,513,954 | Moe | July 4, 1950 |
| 2,514,079 | Lockart | July 4, 1950 |
| 2,518,200 | Sziklai et al. | Aug. 8, 1950 |
| 2,572,858 | Harrison | Oct. 30, 1951 |
| 2,582,271 | Page | Jan. 15, 1952 |
| 2,584,932 | Snyder et al. | Feb. 5, 1952 |
| 2,594,513 | Stocker | Apr. 29, 1952 |
| 2,642,525 | Horn et al. | June 16, 1953 |
| 2,687,493 | Kirkwood | Aug. 24, 1954 |
| 2,880,358 | Parker | Mar. 31, 1959 |

FOREIGN PATENTS

| | | |
|---|---|---|
| 866,065 | France | Mar. 31, 1941 |